United States Patent
Tremblay et al.

(10) Patent No.: US 11,266,252 B2
(45) Date of Patent: Mar. 8, 2022

(54) STORAGE CONTAINER AND BED PROVIDED WITH A STORAGE CONTAINER

(71) Applicant: BOMBARDIER INC., Dorval (CA)

(72) Inventors: Michel Tremblay, Laval (CA); Gradyn Ladd, Pincourt (CA)

(73) Assignee: BOMBARDIER INC., Dorval (CA)

( * ) Notice: Subject to any disclaimer, the term of this patent is extended or adjusted under 35 U.S.C. 154(b) by 143 days.

(21) Appl. No.: 16/464,987

(22) PCT Filed: Nov. 7, 2017

(86) PCT No.: PCT/IB2017/056969
§ 371 (c)(1),
(2) Date: May 29, 2019

(87) PCT Pub. No.: WO2018/100451
PCT Pub. Date: Jun. 7, 2018

(65) Prior Publication Data
US 2019/0320803 A1    Oct. 24, 2019

Related U.S. Application Data

(60) Provisional application No. 62/428,148, filed on Nov. 30, 2016.

(51) Int. Cl.
*A47C 17/86* (2006.01)
*A47C 19/22* (2006.01)
(Continued)

(52) U.S. Cl.
CPC .............. *A47C 17/86* (2013.01); *A47C 19/22* (2013.01); *B60N 3/008* (2013.01); *B60R 7/043* (2013.01);
(Continued)

(58) Field of Classification Search
CPC ........ A47C 17/86; A47C 19/22; B60N 3/008; B60R 7/043; B61D 31/00; B64D 11/003; E05B 53/003; E05B 63/143; E05C 1/08
See application file for complete search history.

(56) References Cited

U.S. PATENT DOCUMENTS

| 5,020,173 A * | 6/1991 | Dreyer, Jr. ............. A47C 17/86 297/188.1 |
| 6,611,973 B2 * | 9/2003 | Connell ................. A47C 17/86 16/35 R |

(Continued)

FOREIGN PATENT DOCUMENTS

| CN | 201718846 U | 1/2011 |
| CN | 202604227 U | 12/2012 |

(Continued)

OTHER PUBLICATIONS

International Search Report and Written Opinion with regard to PCT/IB2017/056969 dated Feb. 22, 2018.
(Continued)

*Primary Examiner* — David R Hare
*Assistant Examiner* — Alexis Felix Lopez
(74) *Attorney, Agent, or Firm* — BCF LLP (57) ABSTRACT

A storage container (100) has a base (102) defining at least one storage compartment (202, 204, 206, 208, 210, 212), a top (104) movable between closed and opened positions, latching and locking assemblies. The latching assembly (500) has a latching actuator (110) movable between first and second positions. The latching assembly (500) locks the top (104) to the base (102) when the top (104) is in the closed position and the latching actuator (110) is in the first position and releases the top (104) from the base (102) when the latching actuator (110) is in the second position. The locking assembly has a lock actuator (801) having actuated and released positions. The top (104) is movable when the
(Continued)

lock actuator (801) is in the actuated position. The locking assembly locking the top (104) in the open, closed, or an intermediate position when the lock actuator (801) is in the released position. The latching actuator (110) and the lock actuator (801) are operatively connected to the top (104) and move with the top (104) between the closed and the opened position.

19 Claims, 8 Drawing Sheets

(51) Int. Cl.
  *B60N 3/00* (2006.01)
  *B60R 7/04* (2006.01)
  *B61D 31/00* (2006.01)
  *B64D 11/00* (2006.01)
  *E05B 53/00* (2006.01)
  *E05C 1/08* (2006.01)

(52) U.S. Cl.
  CPC ............ *B61D 31/00* (2013.01); *B64D 11/003* (2013.01); *E05B 53/003* (2013.01); *B64D 2011/0069* (2013.01); *E05C 1/08* (2013.01)

(56) References Cited

U.S. PATENT DOCUMENTS

| | | | |
|---|---|---|---|
| 6,929,321 B1* | 8/2005 | Shrock | A47C 17/80 297/1 |
| 9,055,823 B1* | 6/2015 | Jannetides | A47C 19/22 |
| 2005/0081293 A1* | 4/2005 | Connell | A47C 19/045 5/308 |
| 2008/0115545 A1* | 5/2008 | Schumm | E05C 17/48 70/107 |
| 2010/0223722 A1* | 9/2010 | Burnett | A61G 7/018 5/11 |
| 2013/0019402 A1* | 1/2013 | Vervoort | A47C 21/028 5/412 |
| 2013/0193818 A1* | 8/2013 | Sturm | A62C 3/14 312/222 |
| 2015/0047397 A1* | 2/2015 | Lackey | E05B 63/143 70/69 |
| 2015/0342358 A1* | 12/2015 | Murphy | A47C 17/86 5/400 |
| 2016/0114889 A1* | 4/2016 | Kearsey | E05B 53/003 312/246 |
| 2016/0200258 A1* | 7/2016 | Chawlk | B60N 2/3047 296/37.14 |
| 2016/0264029 A1* | 9/2016 | Thomas | B60N 2/3018 |
| 2017/0007033 A1* | 1/2017 | Gopalakrishnan | A47C 20/041 |
| 2017/0119165 A1* | 5/2017 | Rohrbach | A47C 17/86 |

FOREIGN PATENT DOCUMENTS

| | | | |
|---|---|---|---|
| DE | 3929784 A1 | 3/1991 | |
| DE | 102014000724 A1 | 7/2015 | |
| DE | 202016100372 U1 | 2/2016 | |
| EP | 1977663 B1 | 8/2010 | |
| EP | 2387915 A2 | 11/2011 | |
| EP | 2901895 A1 | 8/2015 | |
| ES | 1078821 U * | 3/2013 | ............ A47C 17/52 |
| ES | 1078821 U | 3/2013 | |
| JP | 3460293 B2 | 10/2003 | |
| JP | 2006320553 A * | 11/2006 | ............ A47C 17/54 |
| JP | 2006320553 A | 11/2006 | |
| JP | 2007282835 A | 11/2007 | |
| JP | 2008173394 A | 7/2008 | |
| JP | 4921535 B2 | 4/2012 | |
| NL | 8600291 A | 9/1987 | |
| WO | WO-2008020253 A1 * | 2/2008 | ............ E05B 21/00 |
| WO | 2012125042 A1 | 9/2012 | |
| WO | WO-2013098787 A2 * | 7/2013 | ............ A47C 17/86 |

OTHER PUBLICATIONS

English Abstract for DE 202016100372 retrieved on Espacenet on May 29, 2019.
English Abstract for DE 102014000724 retrieved on Espacenet on May 29, 2019.
English Abstract for DE 3929784 retrieved on Espacenet on May 29, 2019.
English Abstract for CN 201718846 retrieved on Espacenet on May 29, 2019.
English Abstract for CN 202604227 retrieved on Espacenet on May 29, 2019.
English Abstract for JP 2007282835 retrieved on Espacenet on May 29, 2019.
English Abstract for JP 4921535 retrieved on Espacenet on May 29, 2019.
English Abstract for JP 3460293 retrieved on Espacenet on May 29, 2019.
English Abstract for JP 2008173394 retrieved on Espacenet on May 29, 2019.
English Abstract for NL 8600291 retrieved on Espacenet on May 29, 2019.
English Abstract for ES 1078821 retrieved on Espacenet on May 29, 2019.

* cited by examiner

FIG. 8

STORAGE CONTAINER AND BED PROVIDED WITH A STORAGE CONTAINER

CROSS-REFERENCE

The present application claims priority to U.S. Provisional Patent Application No. 62/428,148, filed Nov. 30, 2016, entitled "STORAGE CONTAINER AND BED PROVIDED WITH A STORAGE CONTAINER", the entirety of which is incorporated herein.

FIELD OF TECHNOLOGY

The present technology relates to a storage container and a bed provided with the storage container.

BACKGROUND

It is a common practice to maximize storage in places where the amount of room is limited. For example, the amount of room is at a premium in places such as aircraft, trains, other vehicles, small apartments and dormitories. Optimization of storage space is critical in the transportation industries since it allows the transport vehicles to accommodate passengers with more room therein.

Storage containers are sometimes designed to be provided in the base of a bed which allows for storage of large objects. These sometimes require the mattress to be lifted in order to access the storage container. In the case of an aircraft, strong forces resulting from the motion of the aircraft can be experienced during a flight. Providing a bed with a storage container in an aircraft could cause these forces to suddenly push down the mattress and close the storage container.

It would be desirable to provide a bed with a storage container having features that address the conditions particular to aircraft.

It would also be desirable to have a storage container having features that provide reliable visual and/or tactile cues to passengers for indicating that the storage container is safely locked and will not move during operation of the vehicle.

SUMMARY

The present technology may ameliorate at least some deficiencies of the prior art with respect to storage containers and their locking assemblies.

In some implementations of the present technology, there is provided a storage container that has a base defining at least one storage compartment and a top operatively connected to the base. The top is selectively movable between a closed position for covering the at least one storage compartment and an opened position for providing access to the at least one storage compartment. The storage container has a latching assembly. The latching assembly has a latching actuator that is movable between a first position and a second position. When the latching actuator is in the first position and the top is in the closed position, the top is latched in the closed position. The storage container has a locking assembly. The locking assembly has a lock actuator that has an actuated position and a released position. When the latching actuator is in the second position and the lock actuator is in the actuated position, the top is selectively movable between the closed position and the opened position. When the latching actuator is in the second position and the lock actuator is in the released position, the top is prevented from movement and is locked in the closed position, the open position or an intermediate position that is intermediate to the closed position and the opened position.

In some implementations of the storage container, the lock actuator is biased toward the released position.

In some implementations of the storage container, the latching actuator has a handle.

In some implementations of the storage container, the lock actuator is supported by the latching actuator and is movable with the latching actuator.

In some implementations of the storage container, the latching actuator has a first handle and the lock actuator has a second handle.

In some implementations of the storage container, the latching assembly further has at least one receptacle connected to the base. The latching assembly further has at least one locking pin connected to the latching actuator that is movable by the latching actuator. The at least one locking pin is received in the at least one receptacle when the top is in the closed position and the latching actuator is in the first position.

In some implementations of the storage container, misalignment of the at least one locking pin and the at least one receptacle will block the latching actuator from acquiring the first position.

In some implementations of the storage container, the at least one locking pin is operatively connected to the latching actuator by at least one pull cable.

In some implementations of the storage container, the latching actuator is movable between the first and second positions along a first axis. The at least one locking pin is movable by the latching actuator along a second axis. The second axis is perpendicular to the first axis.

In some implementations of the storage container, the latching actuator is movable between the first and second positions along a first axis. The at least one locking pin is movable by the latching actuator along a second axis. The second axis is one of parallel to the first axis and coaxial with the first axis.

In some implementations of the storage container, the storage container further has at least one biasing member operatively connected between the base and the top. The at least one biasing member biases the top toward the opened position. The locking assembly locks the at least one biasing member in position when the lock actuator is in the released position.

In some implementations of the storage container, the at least one biasing member is two biasing members.

In some implementations of the storage container, the at least one biasing member is at least one locking gas strut.

In some implementations of the storage container, the locking assembly further has a gas strut locking assembly of the at least one locking gas strut and at least one cable operatively connecting the lock actuator to the gas strut locking assembly of the at least one locking gas strut.

In some implementations of the storage container, the storage container further has at least one arm operatively connected between the top and the base. The at least one biasing member is operatively connected between the at least one arm and the top.

In some implementations of the storage container, the top is pivotally connected to the base.

In some implementations of the storage container, the storage container further has a first pair of arms operatively connected between the top and the base and a second pair of arms operatively connected between the top and the base. Each of the first and second pair of arms forms a four-bar linkage with the top and the base. The four-bar linkages pivot and translate the top relative to the base as the top moves from the closed position to the opened position.

In some implementations of the storage container, the storage container further has at least one touch latch that selectively retains the latching actuator of the latching assembly in the first position.

In some implementations of the storage container, the latching assembly further has a biasing member that biases the latching actuator of the latching assembly toward the second position.

In some implementations of the storage container, the latching actuator in the second position provides a lever arm for facilitating lifting of the top.

In some implementations of the storage container, the latching actuator and the lock actuator are movable with the top between the closed and the opened positions.

In other implementations of the present technology, there is provided a bed. The bed has a storage container and a mattress disposed on the top of the storage container and movable with the top of the storage container.

In additional implementations of the present technology, there is provided a method for opening a top of a storage container. The method has, with the top of the storage container in a closed position, a step of pulling on a latching actuator operatively connected to the top for unlocking the top from a base of the storage container. The method has a step of actuating a lock actuator. The method has a step of pivoting the top away from the base while the lock actuator is actuated where releasing the lock actuator locks the top in a current position of the top.

In another implementation of the present technology, there is provided a locking arrangement for locking a first component in relation to the second component. The first component has a closed position and an opened position in relation to the second component. The locking arrangement has a latching actuator movable between a first position and a second position. When the latching actuator is in the first position and the first component is in the closed position, the first component is latched in the closed position. The locking arrangement has a lock actuator movable between an actuated position and a released position. When the latching actuator is in the second position and the lock actuator is in the actuated position, the first component is selectively movable between the closed position and the opened position. When the latching actuator is in the second position and the lock actuator is in the released position, the first component is prevented from movement in relation to the second component.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Implementations of a storage container will be described herein as being part of a bed of an aircraft. It is contemplated that the storage container could be provided on its own or as being part of something other than a bed. It is also contemplated that the storage container could be used in a vehicle other than an aircraft, such as a train or a boat or in other non-vehicle locations.

It is contemplated that some implementations of the present technology allow the bed to meet aerospace certification requirements with respect to the performance of a locking arrangement of the storage container of the bed. Some implementations of the present technology allow a latching assembly, described below, to withstand forces of up to 9G in a closed position of the storage container, thus preventing it from becoming inadvertently opened. Some implementations of the present technology allow a locking assembly, described in more detail below, to withstand forces of up to 9G when the top of the storage container is locked in an opened position, thus preventing it from inadvertently opening further or inadvertently closing.

Figure 1:
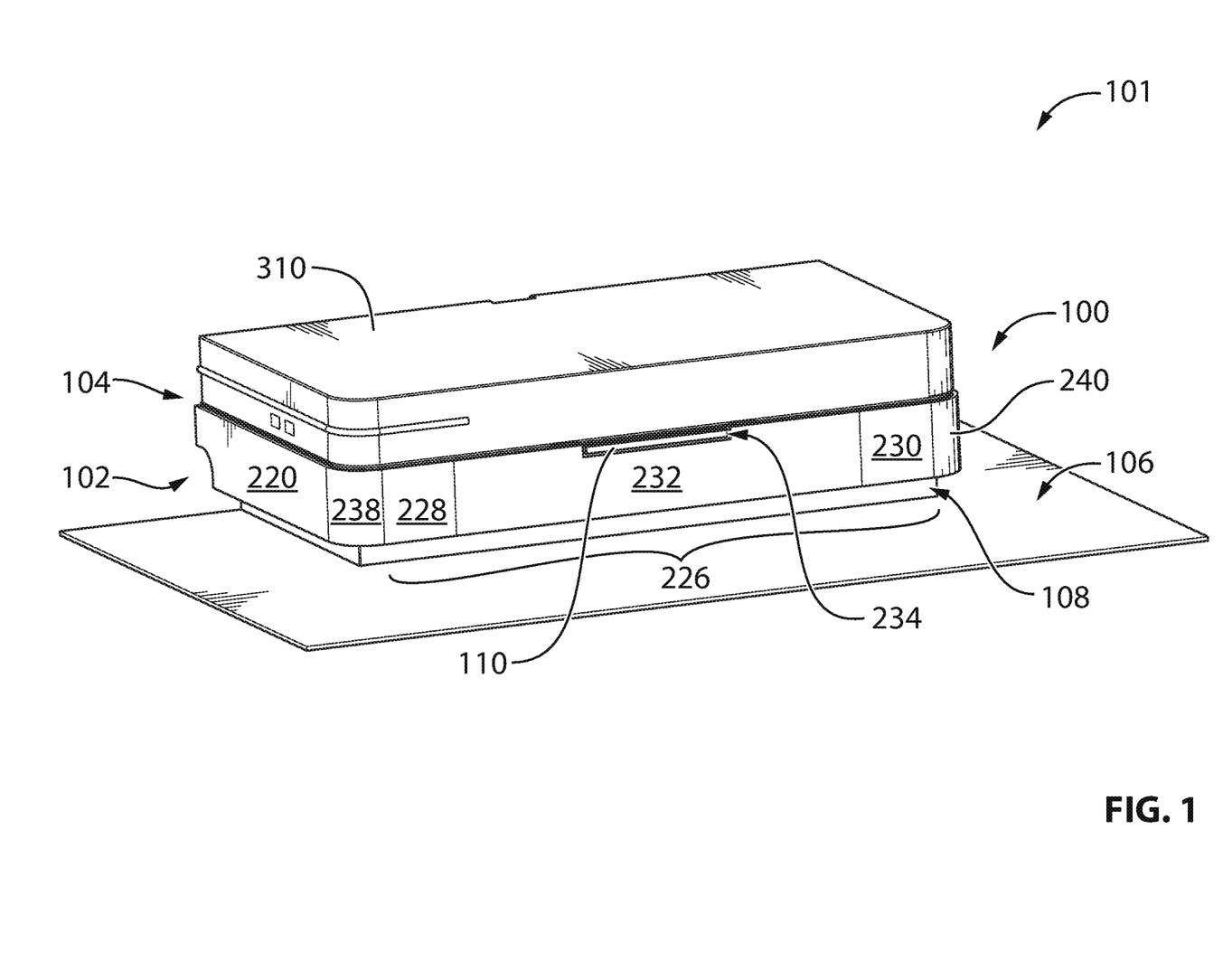
FIG. 1 is an isometric view taken from the front, left side of a bed having a storage container that has a base and a top in a closed position.

In FIG. 1, there is depicted a bed 101 that has a mattress 310 and a storage container 100. The storage container 100 has two main components: a base 102 and a top 104. The base 102 is adapted for connection to a floor 106 by a sub-base 108. The base 102 is fastened to the sub-base 108, and the sub-base 108 is fastened to the floor 106. In other implementations, the base 102 may be fastened directly to the floor 106. The top 104 is operatively connected to the base 102 as it will be described in more detail below. The top 104 is depicted in a closed position in FIG. 1 and in an opened position in FIG. 2. The top 104 is in the closed position or in the opened position in relation to the base 102.

Figure 3:
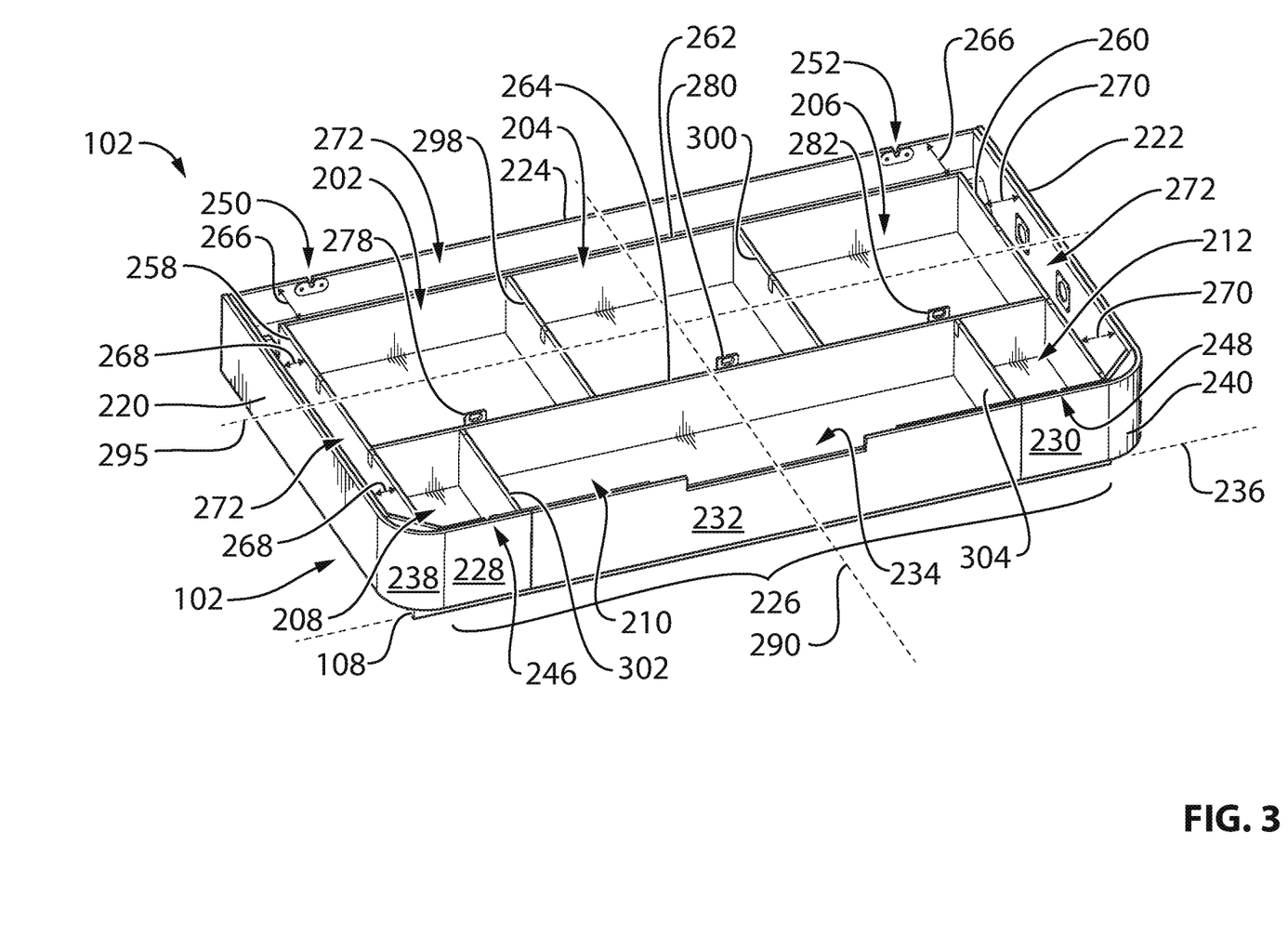
FIG. 3 is an isometric view taken from the front, left side of the base of the storage container of FIG. 1 without the top thereof.

As most clearly depicted in FIG. 3, the base 102 defines six storage compartments 202, 204, 206, 208, 210 and 212. In other implementations of the present technology, it is contemplated that the base 102 may define more or less than the six storage compartments 202, 204, 206, 208, 210 and 212 such as only one storage compartment, for example. The base 102 has a front exterior side wall 220, a back exterior side wall 222, a right exterior wall 224, a left exterior wall 226, a front left corner wall 238 and a back left corner wall 240.

The left exterior wall 226 has a front portion 228, a back portion 230 and a middle portion 232. The middle portion 232 extends longitudinally between the front portion 228 and the back portion 230. The middle portion 232 is provided with a notch 234. The notch 234 receives a latching actuator, which in the present implementation includes the handle 110, when the top 104 is in the closed position, such as depicted in FIG. 1. The middle portion 232 is pivotally connected to the front portion 228 and to the back portion 230 such that the middle portion 232 pivots outwardly from the base 102 around a door axis 236 depicted in FIG. 3. The middle portion 232 is pivotally connected in order to allow quick access to the storage compartment 210 without having to lift the top 104 open. For example, the storage compartment 210 may store a life vest and/or a life raft which may be quickly retrieved therefrom by pivoting the middle portion 232. The front portion 228 is provided with a notch 246 for receiving a top pin 242 of the top 104, depicted in FIG. 2, when the top 104 is in the closed position. The back portion 230 is provided with a notch 248 for receiving a top pin 244 of the top 104 when the top 104 is in the closed position. When the top pins 242 and 244 are received by the notches 246 and 248, respectively, movement of the top 104 with respect to the base 102 is restricted along the longitudinal direction of the bed 101.

The front left corner wall 238 and the back left corner wall 240 have curved profiles. In other implementations, the front left corner wall 238 and the back left corner wall 240 may have other profiles such as flat profiles, for example. In some implementations, the front exterior side wall 220 may be affixed to the front portion 228 directly and without a need for the front left corner wall 238.

The front exterior side wall 220 extends laterally from the right exterior wall 224, to which it is affixed, to the front left corner wall 238, to which it is affixed. The back exterior side wall 222 extends laterally from the right exterior wall 224, to which it is affixed, to the back left corner wall 240, to which it is affixed. The right exterior wall 224 extends longitudinally from the front exterior side wall 220 to the back exterior side wall 222. The right exterior wall 224 is provided with a notch 250 near the front end of the right exterior wall 224 and with a notch 252 near the back end of the right exterior wall 224. The notch 250 receives a top pin 254 of the top 104, depicted in FIG. 4, when the top 104 is in the closed position. The notch 252 receives a top pin 256 of the top 104 when the top 104 is in the closed position. When the top pins 254 and 256 are received by the notches 250 and 252, respectively, movement of the top 104 with respect to the base 102 is restricted along the longitudinal direction of the bed 101.

Returning to FIG. 3, the base 102 also has a front interior side wall 258, a right interior wall 262, a back interior side wall 260 and a longitudinal interior wall 264. The front interior side wall 258 extends parallel to the front exterior side wall 220 at a front longitudinal distance 268 from the front exterior side wall 220. The front interior side wall 258 has a height (vertical length) that is shorter than the height of the front exterior side wall 220.

The back interior side wall 260 extends parallel to the back exterior side wall 222 at a back longitudinal distance 270 from the back exterior side wall 222. The front longitudinal distance 268 is equal to the back longitudinal distance 270. In other implementations, it is contemplated that the front longitudinal distance 268 could be different from the back longitudinal distance 270. The back interior side wall 260 has a height (vertical length) that is shorter than the height of the back exterior side wall 222.

The right interior wall 262 extends longitudinally from the front interior side wall 258, to which it is affixed, to the back interior side wall 260, to which it is affixed. The right interior wall 262 is disposed inwardly from the right exterior wall 224 such that it extends parallel to the right exterior wall 224 at a lateral distance 266 from the right exterior wall 224. The right interior wall 262 has a height (vertical length) that is shorter than the height of the right exterior wall 224.

The front interior side wall 258, the front left corner wall 238, the front exterior side wall 220, the right exterior wall 224, the back exterior side wall 222, the back left corner wall 240, the back interior side wall 260 and the right interior wall 262 define a pivoting assembly space 272. The pivoting assembly space 272 is provided for accepting a pivoting assembly 274 and a pivoting assembly 276, depicted in FIG. 2. The pivoting assembly space 272 is a sufficient clearance space for allowing an unobstructed movement of the top 104 between its closed and opened positions.

The longitudinal interior wall 264 extends parallel to the right interior wall 262 and longitudinally from the front interior side wall 258, to which it is affixed, to the back interior side wall 260, to which it is affixed. The longitudinal interior wall 264 is parallel to a longitudinal centerline 295 of the base 102 which extends longitudinally at an identical lateral distance from the left exterior wall 226 and the right exterior wall 224. The longitudinal interior wall 264 has a height (vertical length) that is shorter than the height of the right exterior wall 224 and of the left exterior wall 226.

Receptacles 278, 280 and 282, each defining an aperture, are fastened to the top of the longitudinal interior wall 264. In other implementations, it is contemplated that one, two or more than three receptacles may be affixed to the top of the longitudinal interior wall 264 without departing from the scope of the present technology.

The receptacle 280 extends longitudinally and entirely at the back of a lateral centerline 290 which extends laterally at an identical longitudinal distance from the front exterior side wall 220 and the back exterior side wall 222. In one implementation, the receptacle 280 may extend longitudinally and entirely at the front of the lateral centerline 290. In another implementation, the receptacle 280 may extend longitudinally and in alignment with the lateral centerline 290. The receptacle 278 extends longitudinally and entirely to the front of the lateral centerline 290. The receptacle 282 extends longitudinally and entirely to the back of the lateral centerline 290. The receptacle 278 and the receptacle 282 are disposed at identical longitudinal distances away from the lateral centerline 290. In other implementations, the receptacle 278 and the receptacle 282 may be disposed at different longitudinal distances away from the lateral centerline 290. The receptacle 278 selectively receives a locking pin 292, depicted in FIGS. 2 and 5, in order to latch the top 104 in the closed position. The receptacle 280 selectively receives a locking pin 294 in order to latch the top 104 in the closed position. The receptacle 282 selectively receives a locking pin 296 in order to latch the top 104 in the closed position.

Returning to FIG. 3, the base 102 has lateral interior walls 298, 300, 302 and 304. The lateral interior walls 298, 300, 302 and 304 with the left exterior wall 226, the front interior side wall 258, the back interior side wall 260, the right interior wall 262 and the longitudinal interior wall 264 define the six storage compartments 202, 204, 206, 208, 210 and 212. As described above, while six storage compartments 202, 204, 206, 208, 210 and 212 are shown in FIG. 3, the base 102 may define more or fewer storage compartments, such as only one storage compartment, for example. The lateral interior walls 298, 300, 302 and 304 have a height (vertical length) that is smaller than the height of anyone of the front exterior side wall 220, the back exterior side wall 222, the right exterior wall 224, the left exterior wall 226, the front left corner wall 238 and the back left corner wall 240.

As previously described, the top 104 is operatively connected to the base 102. The top 104 is pivotally connected to the base 102 by the pivoting assemblies 274 and 276. The pivoting assemblies 274 and 276 allow, at least in part, the top 104 to be selectively movable between the closed position thereof, in which the six storage compartments 202, 204, 206, 208, 210 and 212 are covered by the top 104, and the opened position thereof, in which the six storage compartments 202, 204, 206, 208, 210 and 212 are accessible (see FIG. 2).

The top 104 has a platform 306 and a top frame 308 fastened to the bottom surface thereof. The mattress 310 is disposed on the top 104 and is movable with the top 104. More precisely, the mattress 310 is removably affixed to a top surface of the platform 306. As more clearly depicted in FIG. 5, the top frame 308 has a front side member 602, a back side member 604, a right member 606, a left member 608, a front left corner member 610, a back left corner member 612 and longitudinal members 614 and 616. In other implementations, the top frame 308 may have more or less members that could be arranged differently. In additional implementations, the front side member 602, the back side member 604, the right member 606, the left member 608, the front left corner member 610, the back left corner member 612 and the longitudinal members 614 and 616 may be integrated with the platform 306.

Figure 5:
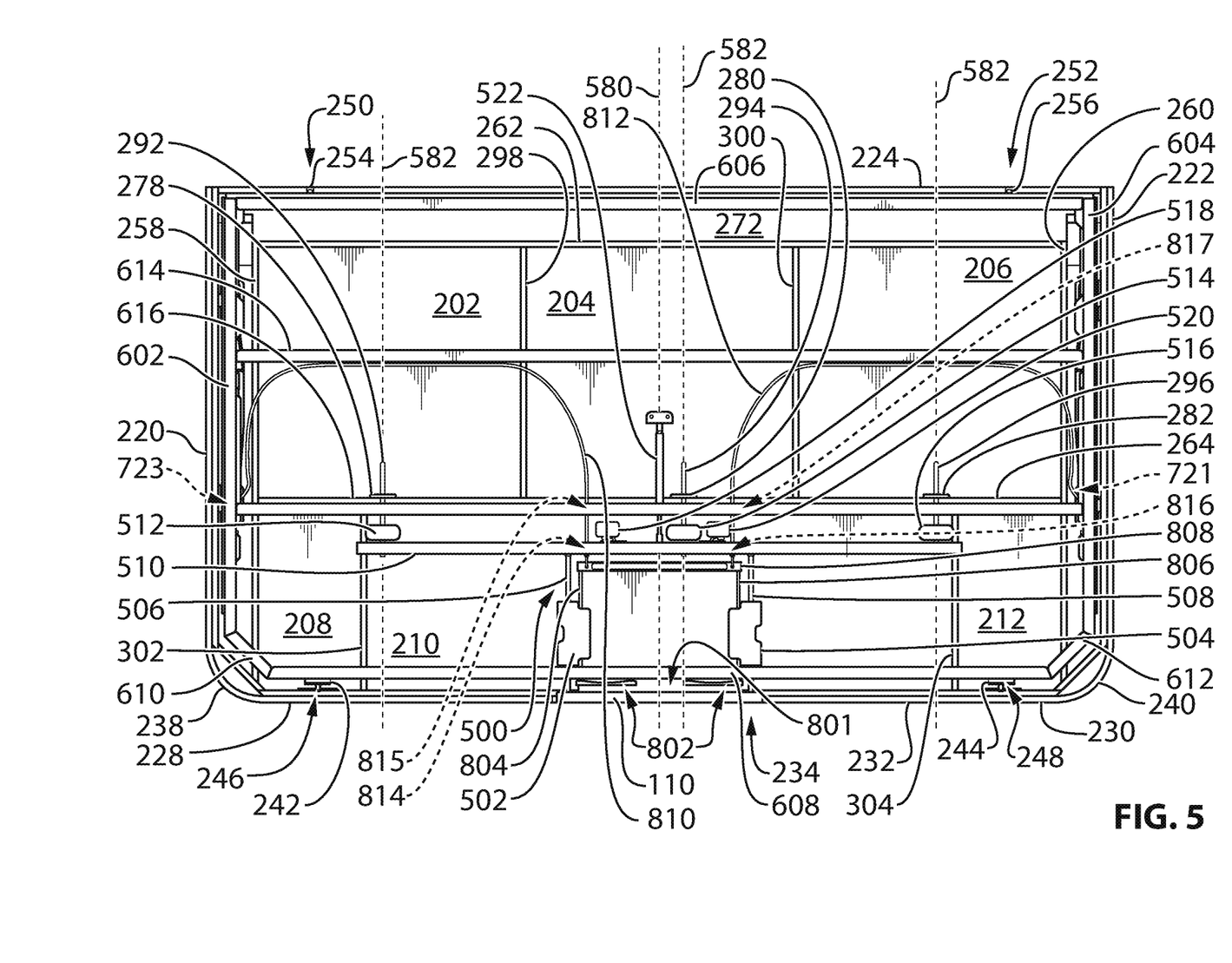
FIG. 5 is a top plan view of the bed of FIG. 1 with the top in the closed position, with the latching assembly in a latched position and with the mattress and the ceiling of the top of the storage container removed.

The front side member 602 extends laterally from the right member 606 to the front left corner member 610. The front side member 602 also extends parallel to the front exterior side wall 220. The front side member 602 is disposed inwardly of the front exterior side wall 220. The back side member 604 extends laterally from the right member 606 to the back left corner member 612. The back side member 604 also extends parallel to the back exterior side wall 222. The back side member 604 is disposed inwardly of the back exterior side wall 222.

The right member 606 extends longitudinally from the front side member 602 to the back side member 604 and is parallel to the right exterior wall 224. The right member 606 is disposed inwardly of the right exterior wall 606. The top pin 254 is fastened to the right member 606 and extends outwardly from the right member 606 such that the top pin 254 is longitudinally aligned with the notch 250 that is located in the base 102 in order to be received therein when the top 104 is in the closed position, such as in FIG. 5. The top pin 256 is fastened to the right member 606 and extends outwardly from the right member 606 such that the top pin 256 is longitudinally aligned with the notch 252 that is located in the base 102 in order to be received therein when the top 104 is in the closed position.

The front left corner member 610 extends leftwardly and backwardly from the front side member 602 to the left member 608. In some implementations, the front left corner member 610 may be omitted such that the front side member 602 may extend to the left member 608 directly.

The back left corner member 612 extends leftwardly and forwardly from the back side member 604 to the left member 608. In some implementations, the back left corner member 612 may be omitted such that the back side member 604 may extend to the left member 608 directly.

The left member 608 extends longitudinally from the front left corner member 610 to the back left corner member 612. The left member 608 is also parallel to the left exterior wall 226 (see FIG. 2) and is disposed inwardly of the left exterior wall 226. The top pin 242 is fastened to the left member 608 and extends outwardly from the left member 608 such that the top pin 242 is longitudinally aligned with the notch 246 that is located in the base 102 in order to be received therein when the top 104 is in the closed position, as depicted in FIG. 5. The top pin 244 is fastened to the left member 608 and extends outwardly from the left member 608 such that the top pin 244 is longitudinally aligned with the notch 248 that is located in the base 102 in order to be received therein when the top 104 is in the closed position.

The longitudinal members 614 and 616 extend longitudinally from the front side member 602 to the back side member 604. The longitudinal members 614 and 616 are parallel to the right side member 606 and the left side member 608.

Figure 6:
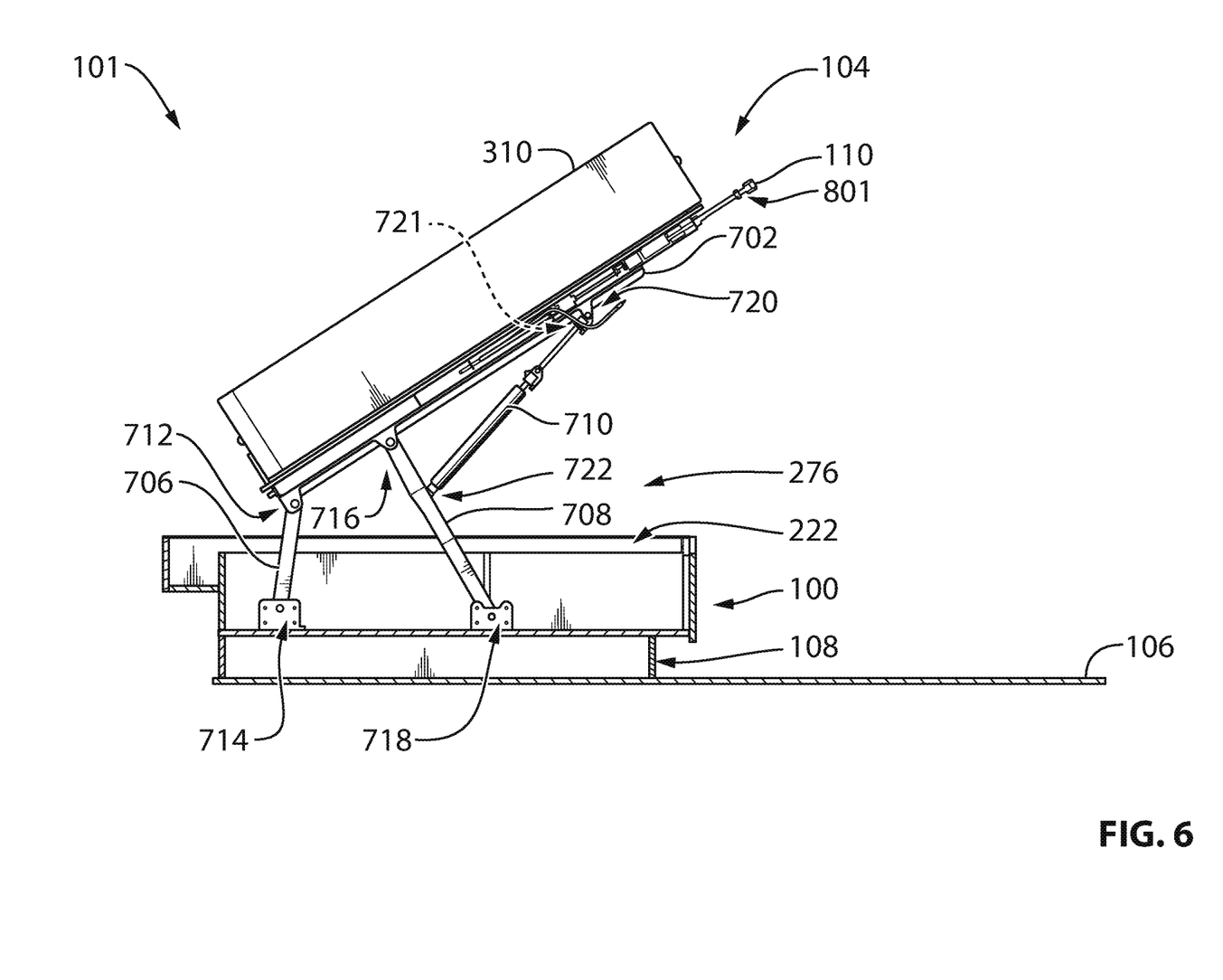
FIG. 6 is a cross-sectional view of the bed of FIG. 2 taken through a lateral centerline of the bed.

The pivoting assembly 276 will now be described in more detail with reference to FIG. 6. The pivoting assembly 274 is a mirror image of the pivoting assembly 276 and will not be described at length in the present specifications in order to avoid redundancy. It is contemplated that the pivoting assembly 274 may not be the mirror image of the pivoting assembly 276.

The pivoting assembly 276 has a top member 702 and a pair of arms 706 and 708. The top member 702 is an L-shape member fastened to the bottom surface of the back side member 604. The top member 702 is disposed inwardly of the back exterior side wall 222 such that it is received in the pivoting assembly space 272 when the top 104 is in the closed position.

The arm 706 is pivotally connected at the top thereof to the top member 702 by a bracket 712 formed by the top member 702. The arm 706 is pivotally connected at the bottom thereof to the interior side of the back exterior side wall 222 by a bracket 714. The arm 708 is pivotally connected at the top thereof to the top member 702 by a bracket 716 formed by the top member 702. The arm 708 is pivotally connected at the bottom thereof to the interior side of the back exterior side wall 222 by a bracket 718. The pair of arms 706 and 708 is, therefore, operatively connected between the top 104 and the base 102 such that the top 104 is pivotally connected to the base 102.

The top 104, the base 102 and the pair of arms 706 and 708 together form a back four-bar linkage. Similarly, the pivoting assembly 274 forms a front four-bar linkage with the top 104 and the base 102. These four-bar linkages allow, at least in part, pivoting and translating leftwardly the top 104 relative to the base 102 as the top 104 moves from the closed position to the opened position. Pivoting and translating leftwardly the top 104 of the bed 101 allows, at least in part, an unobstructed movement of the top 104 relative to the base 102 when the right side of the bed 101 is disposed next to an aircraft wall.

The pivoting assembly 276 is operatively connected to a biasing member. The biasing member operatively connects the arm 708 to the top 104 for biasing the top 104 toward the opened position. In the present implementation, the biasing member of the pivoting assembly 276 is a locking gas strut 710. The pivoting assembly 274 is similarly operatively connected to the top 104 by a biasing member, which in the present implementation is a locking gas strut 711. It is contemplated that biasing members other than the locking gas struts 710 and 711 could be used. In some implementations, the pivoting assembly 274 may not be provided with the corresponding biasing member. In additional implementations the storage container 100 may have more than two biasing members operatively connecting the base 102 and the top 104.

The back locking gas strut 710 is pivotally connected at the top thereof to the top member 702 by a bracket 720 formed by the top member 702. The back locking gas strut 710 is pivotally connected at the bottom thereof to the arm 708 by a bracket 722 formed by the arm 708.

As seen in FIG. 5, a locking arrangement of the storage container 100 has a latching assembly 500. The latching assembly 500 includes the handle 110. The handle 110 is affixed to handle rods 506 and 508. The handle rod 506 extends from the handle 110 to a longitudinal member 510 through two sleeve bearings (not shown) mounted to a plate 502. The plate 502 is fastened to the bottom surface of the platform 306. The handle rod 506 extends from the handle 110 to the longitudinal member 510 through two sleeve bearings (not shown) mounted to a plate 504. The plate 504 is fastened to the bottom surface of the platform 306.

The longitudinal member 510 is affixed to the handle rods 506 and 508. The locking pins 292, 294 and 296 are affixed to the longitudinal member 510 such that they extend rightwardly from the longitudinal member 510 through sleeve bearings 512, 514 and 516, respectively. In other implementations, one, two or more than three locking pins may be affixed to the longitudinal member 510. The sleeve bearings 512, 514 and 516 are fastened to the bottom surface of the platform 306. The locking pins 292, 294 and 296 are affixed to the longitudinal member 510 such that they are longitudinally aligned with the apertures in the receptacles 278, 280 and 282 located in the base 102, respectively. The locking pins 292, 294 and 296 are affixed to the longitudinal member 510 such that they are vertically aligned with the apertures in the receptacles 278, 280 and 282, respectively, when the top 104 is in the closed position. A handle biasing member 522, in the form of a strut, has a left end that is affixed to the longitudinal member 510 and has a right end that is fastened to the bottom surface of the platform 306. The biasing member 522 biases the longitudinal member 510 toward the left.

Figure 2:
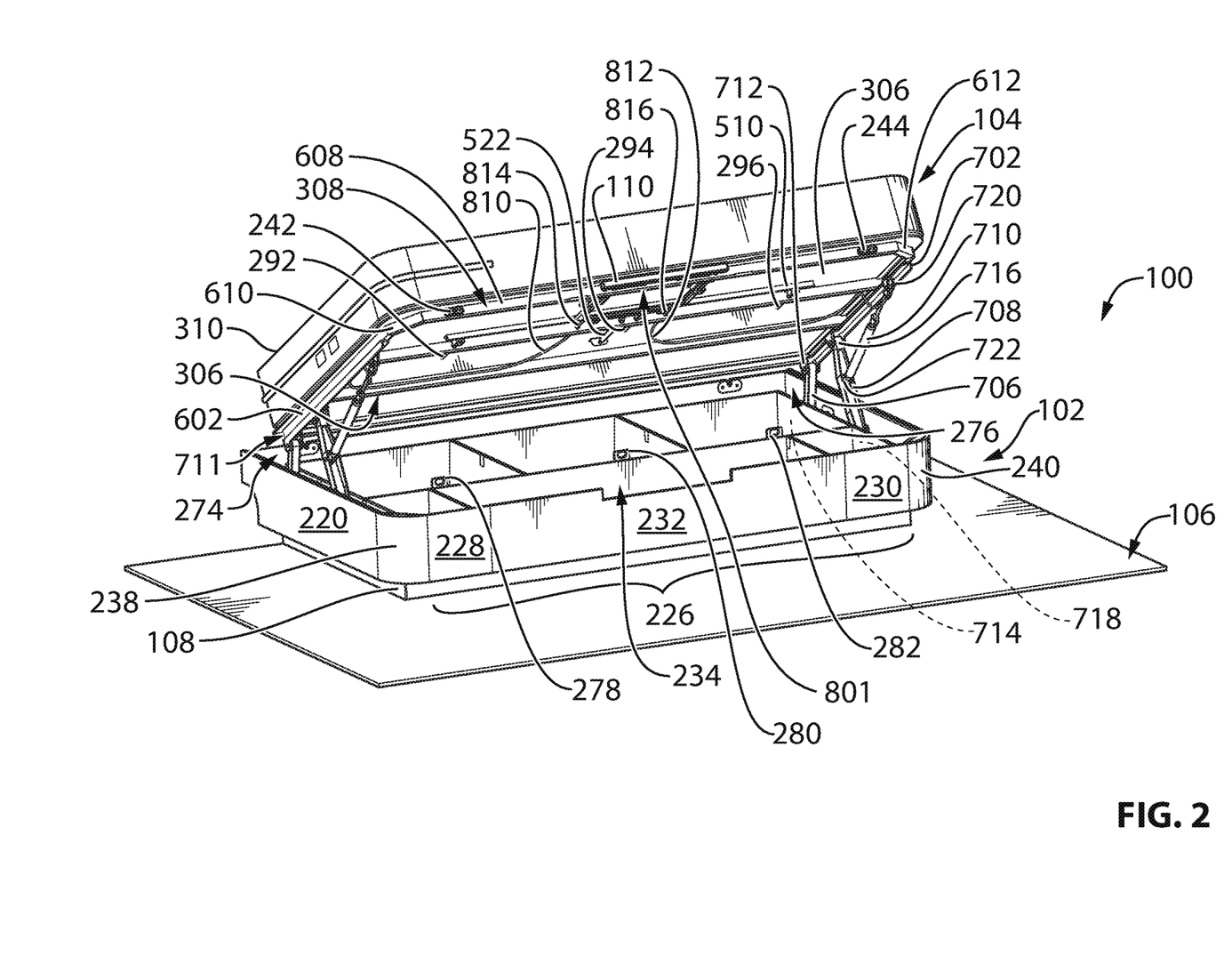
FIG. 2 is an isometric view taken from the front, left side of the bed of FIG. 1 with the top in a opened position.
Figure 4:
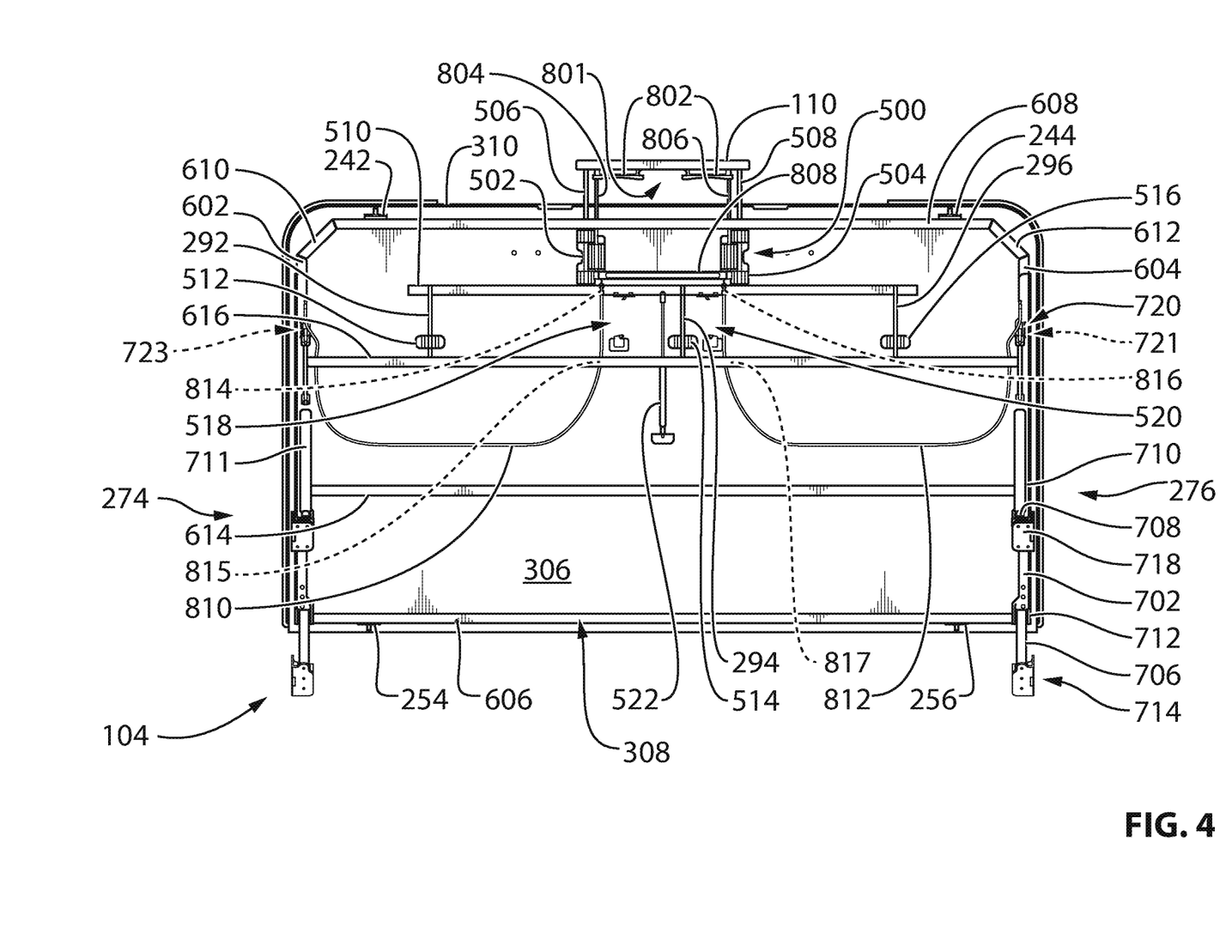
FIG. 4 is a plan view of a bottom of the top of the storage container of FIG. 1 with a latching assembly in an unlocked position and with the base of the storage container removed.

The handle 110 is operatively connected to the top 104. The handle 110 is movable between a received position and an extended position along a handle axis 580 that extends laterally and which is normal to the left exterior wall 226. The handle axis 580 is parallel to a biasing direction of the handle biasing member 522. In FIGS. 1 and 5, the handle 110 is in the received position. In FIGS. 2 and 4, the handle 110 is in the extended position.

When the handle 110 is in the received position, the locking pins 292, 294 and 296 are received by the receptacles 278, 280 and 282, respectively. When the top 104 is in the closed position and the handle 110 is in the received position (see FIG. 5), the latching assembly 500 latches the top 104 to the base 102 such that the top 104 is prevented from moving from the closed position to the opened position. When the handle 110 is in the received position, the longitudinal member 510 is latched in place by touch-latch assemblies 518 and 520 as shown in FIG. 5. In some implementations, the latching assembly 500 may be provided with one or more than two touch-latch assemblies. In other implementations, the touch-latch assemblies 518 and 520 may be omitted. In other implementations, other devices could be provided instead of, or in addition to, the touch-latch assemblies 518 and 520. The touch-latch assemblies 518 and 520 selectively retain the handle 110 in the received position. The handle biasing member 522 biases the handle 110 toward the extended position. When an operator (not depicted) presses on the handle 110, the touch-latch assemblies 518 and 520 selectively unlatch the handle 110 and the handle biasing member 522 moves the handle 110 from the received position into the extended position. In some implementations, the handle biasing member 522 may be omitted such that the operator has to pull the handle 110 in order to move the handle 110 from the received position into the extended position.

When the handle 110 is in the extended position, the locking pins 292, 294 and 296 are disengaged from the receptacles 278, 280 and 282, respectively. The locking pins 292, 294 and 296 are movable by the handle 110 along pin axes 582 that are parallel to the handle axis 580.

When the handle 110 is in the extended position, the operator pushes on the handle 110 along the handle axis 580 in order to move the handle 110 from the extended position to the received position.

If the locking pins 292, 294 and 296 are longitudinally and vertically aligned with the apertures of the receptacles 278, 280 and 282, respectively, the handle 110 is permitted to acquire the received position. As a result, when the top 104 is in the closed position and the handle 110 (i.e., the latching actuator) is moved from the extended position to the received position, the operator receives a positive feedback in the form of a visual confirmation that the top 104 is securely locked in the closed position.

If the top 104 is in the closed position and the locking pins 292, 294 and 296 are not longitudinally or vertically aligned with the apertures of the receptacles 278, 280 and 282, respectively, the handle 110 is prevented from acquiring the received position. When the top 104 is in the closed position, misalignment of the locking pins 292, 294 and 296 and the apertures of the receptacles 278, 280 and 282, respectively, will cause the locking pins 292, 294 and 296 to hit the receptacles 278, 280 and 282 and will block the handle 110 (i.e., the latching actuator) from acquiring the received position. As a result, when the handle 110 is prevented from acquiring the received position due to the misalignment, the operator receives a positive feedback in the form of a visual confirmation and a haptic feedback that the top 104 is unlocked in the closed position. Hence, the latching assembly 500 provides the operator with positive feedback in order to prevent the top 104 from being inadvertently left unlatched in the closed position.

Figure 7:
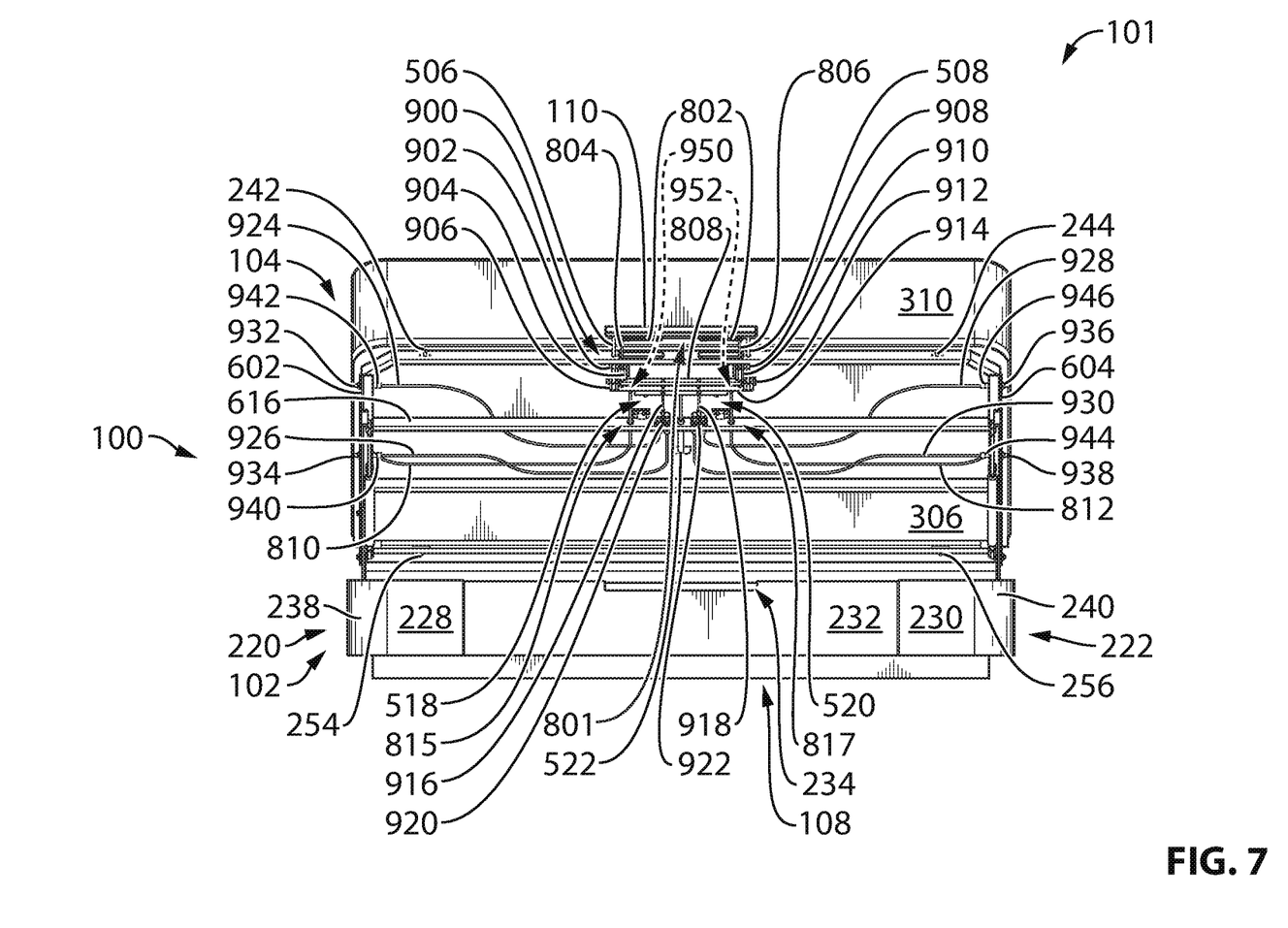
FIG. 7 is a left side elevation view of the bed of FIG. 1 with the storage container in an opened position and having an alternative implementation of the latching assembly.
Figure 8:
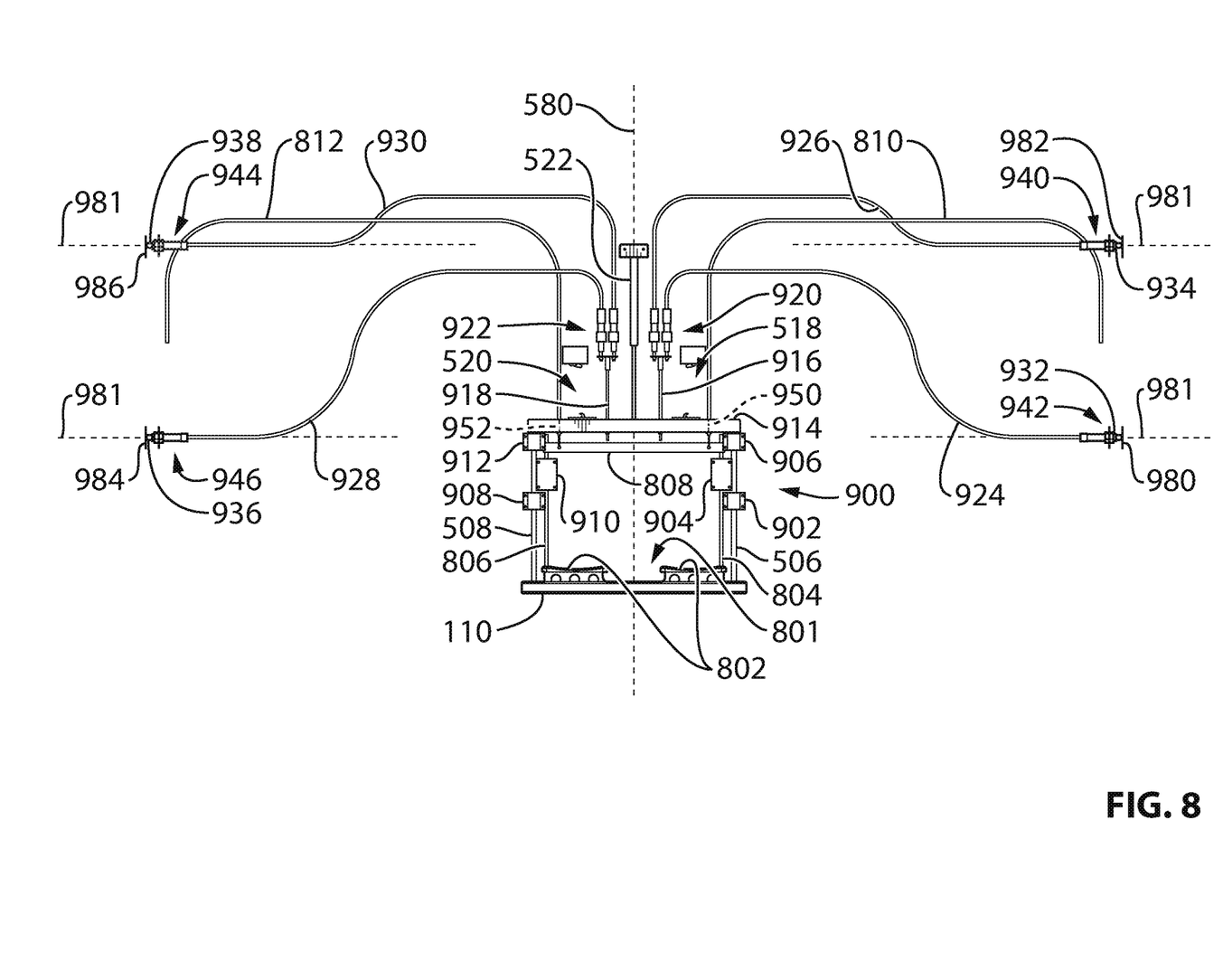
FIG. 8 is a bottom plan view of the locking assembly and of the alternative implementation of the latching assembly of the storage container of FIG. 7.

In an alternative implementation of the present technology depicted in FIGS. 7 and 8, the storage container 100 has the latching assembly 500 replaced by a latching assembly 900. The latching assembly 900 has locking pins 932, 934, 936 and 938. The locking pins 932, 934, 936 and 938 are operatively connected to the handle 110 by pull cables 924, 926, 928 and 930, respectively. The locking pins 932, 934, 936 and 938 are connected to the pull cables 924, 926, 928 and 930, respectively, by connectors 942, 940, 946 and 944, respectively. In this case, the locking pins 932, 934, 936 and 938 are movable along pin axes 981 that are perpendicular to the handle axis 580. Moreover, the connectors 942 and 940 are fastened perpendicularly through the front side member 602 such that the locking pins 932 and 934 extend outwardly from the front side member 602. Similarly, the connectors 946 and 944 are fastened perpendicularly through the back side member 604 such that the locking pins 936 and 938 extend outwardly from the back side member 604. In this alternative implementation, receptacles 980 and 982 are fastened to the interior side of the front exterior side wall 220 such that they are vertically and laterally aligned with the locking pins 932 and 934, respectively, for selectively receiving the locking pins 932 and 934, respectively, when the top 104 is in the closed position. Also in this alternative implementation, receptacles 984 and 986 are fastened to the interior side of the back exterior side wall 222 such that they are vertically and laterally aligned with the locking pins 936 and 938, respectively, for selectively receiving the locking pins 936 and 938, respectively, when the top 104 is in the closed position.

The latching assembly 900 has a longitudinal member 914 affixed to the handle rods 506 and 508. In this alternative implementation, the handle rod 506 extends through a pair of single sleeve bearings 902 and 906 and the handle rod 508 extends through a pair of single sleeve bearings 908 and 912. In this alternative implementation, the pull cables 924 and 926 are connected to one side of a double connector 920 which is fastened perpendicularly through the longitudinal member 616. Similarly, the pull cables 928 and 930 are connected to one side of a double connector 922 which is fastened perpendicularly through the longitudinal member 616. A pull rod 916 passes through the longitudinal member 914 and is adjustably retained on a left side of the pull rod 916 with a fastener, such as a nut for example. The pull rod 916 is fastened at the other side thereof to the other side of the double connector 920. Similarly, a pull rod 918 passes through the longitudinal member 914 and is adjustably retained on a left side of the pull rod 918 with a fastener. The pull rod 918 is fastened at the other side thereof to the other side of the double connector 922. The double connector 920 transfers a pulling force applied to the pull rod 916 to the pull cables 924 and 926 and the double connector 922 transfers a pulling force applied to the pull rod 918 to the pull cables 928 and 930.

When the handle 110 of the locking arrangement is in the extended position and the top 104 is in the closed position, the latching assembly 500, or the alternative latching assembly 900, releases the top 104 from the base 102 such that the top 104 is permitted to move from the closed position to the opened position.

Turning back to FIGS. 4 and 5, the locking arrangement of the storage container 100 also has a locking assembly (not numbered). The locking assembly has a lock actuator including a handle 801, which has a pair of grips 802, operatively connected to the top 104 and has an actuated position and a released position. The handle 801 is partially received in and supported by the handle 110 and is movable together with the handle 110. Also, the handle 110 and the lock actuator move with the top 104 between the closed position and the opened position. In some implementations, the lock actuator may include more than one handle. In other implementations, the handle 801 may be replaced by another device such as a switch or a button for example and without departing from the scope of the present technology. In another implementation, the lock actuator may be provided separately from the handle 110 while still being operatively connected to the top 104 and movable with the top 104 between the closed position and the opened position. The lock actuator is in the actuated position when the pair of grips 802 is squeezed simultaneously toward the handle 110. The lock actuator is in the released position when the pair of grips 802 is released. The lock actuator is biased toward the released position. Thus, the handle 801 (as well as the pair of grips 802) is biased toward the position shown in FIG. 5.

The handle 801 is connected to a front actuator rod 804 and to a back actuator rod 806. The front actuator rod 804 extends rightwardly from the handle 801, through a sleeve bearing (not shown) mounted to the plate 502, toward a longitudinal actuator bar 808. The back actuator rod 806 extends rightwardly from the handle 801, through a sleeve bearing (not shown) mounted to the plate 504, toward the longitudinal actuator bar 808. In the alternative implementation depicted in FIGS. 7 and 8, the front actuator rod 804 extends through a single sleeve bearing 904 and the back actuator rod 806 extends through a single sleeve bearing 910.

The longitudinal actuator bar 808 is connected to a front pull cable 810 and a back pull cable 812. As depicted in FIG. 5, the front pull cable 810 extends rightwardly from the longitudinal actuator bar 808 through a front orifice 814 of the longitudinal member 510, then through a front orifice 815 of the longitudinal member 616 and then extends forwardly to a gas strut locking assembly 723 of the front locking gas strut 711. The gas strut locking assembly 723 is an actuation device which, when actuated by the front pull cable 810, enables the front locking gas strut 711 to extend (or contract). When the gas strut locking assembly 723 is released by the front pull cable 810, the front locking gas strut 711 stops extending (or contracting) and is locked. In the alternative implementation depicted in FIG. 7, the front pull cable 810 extends rightwardly from the longitudinal actuator bar 808 through a front orifice 950 of the longitudinal member 914, then through a front orifice 815 of the longitudinal member 616 and then extends forwardly to the front locking gas strut 711. The front pull cable 810 is connected to the front locking gas strut 711, and therefore, operatively connects the lock actuator to the pivoting assembly 274.

As depicted in FIG. 5, the back pull cable 812 extends rightwardly from the longitudinal actuator bar 808 through a back orifice 816 of the longitudinal member 510, then through a back orifice 817 of the longitudinal member 616 and then extends backwardly to a gas strut locking assembly 721 of the back locking gas strut 710. In the alternative implementation depicted in FIG. 7, the back pull cable 812 extends rightwardly from the longitudinal actuator bar 808 through a back orifice 952 of the longitudinal member 914, then through a back orifice 817 of the longitudinal member 616 and then extends backwardly to the back locking gas strut 710. The back pull cable 812 is connected to the back locking gas strut 710. The back pull cable 812 operatively connects the lock actuator to the gas strut locking assembly 721. The gas strut locking assembly 721 is identical to the gas strut locking assembly 723, but it is contemplated that it could be different. The back pull cable 812 also operatively connects the lock actuator to the pivoting assembly 276.

As such, the handle 801 is operatively connected to the front locking gas strut 711 and to the back locking gas strut 710. In implementations where there is only one locking gas strut, only one pull cable operatively connects the lock actuator to the locking gas strut.

When the lock actuator is in the released position, by releasing the pair of grips 802, the front and back locking gas struts 711 and 710 are locked by the gas strut locking assemblies 723, 721 and prevent the top 104 from moving. The locking assembly locks the top 104 in the closed position when the top 104 is in the closed position and the lock actuator is in the released position. Additionally, the locking assembly locks the top 104 in any given position at which the lock actuator is in the released position. In some implementations, when the locking assembly locks the top 104 in any position, the top 104 will remain in position with forces of up to 9G being applied to it.

When the operator squeezes the pair of grips 802, the lock actuator moves from the released position into the actuated position. When the lock actuator is in the actuated position and the latching actuator is in the extended position, the front and back locking gas struts 711 and 710 are unlocked and the top 104 can be moved.

When the handle 110 is in the extended position, the handle 110 provides a lever arm facilitating the movement of the top 104 by the operator from the closed position to the opened position and vice versa. The handle 110 provides a mechanical advantage for moving the top 104 from the closed position to the opened position and vice versa.

While the top 104 is moving from the closed position toward the opened position, the operator may stop squeezing the pair of grips 802. Since the pair of grips 802 (as well as the handle 801) is biased away from the handle 110, the lock actuator returns to the released position. When the lock actuator of the locking arrangement returns to the released position, the front and back locking gas struts 711 and 710 are locked again and prevent the top 104 from moving in relation to the base 102. This means that the top 104 will be locked in an intermediate position which is between the closed position and the opened position. The intermediate position will be the position in which the top 104 finds itself when the handle 801 acquires the released position.

The operator may then squeeze the pair of grips 802 again which moves the lock actuator from the released position into the actuated position. As a result, the top 104 can be moved from the intermediate position toward the opened position or the closed position. The operator may stop squeezing the pair of grips 802 when the top 104 is in the opened position which moves the lock actuator from the actuated position into the released position. The locking assembly locks the top 104 in the opened position when the top 104 is in the opened position and the lock actuator is in the released position.

The operator may squeeze the pair of grips 802 again which moves the lock actuator from the released position into the actuated position. As a result, the top 104 can be moved from the opened position toward any intermediate position or the closed position. Therefore, the operator may move the top 104 in any given position amongst the closed position, all intermediary positions and the closed position and lock the top 104 in that position by releasing the pair of grips 802.

A method of opening the top 104 of the storage container 100 will now be described. The method begins when the top 104 of the storage container 100 is in the closed position. The latching assembly 500 is latching the top 104 to the base 102 of the storage container 100 since the handle 110 is in the received position such as depicted in FIG. 1. The locking assembly is also locking the top 104 in the closed position since the lock actuator is in the released position. The method continues with the operator pressing and then pulling on the handle 110 that is operatively connected to the top 104. By pressing the handle 110, the operator unlatches the handle 110 from the touch-latch assemblies 518 and 520 (see FIG. 4). By pulling the handle 110, the operator unlatches the top 104 from the base 102 of the storage container 100 as described above. When the handle 110 is pressed and then pulled, the top 104 is unlatched from the base 102; however, since the lock actuator is still in the released position, the top 104 still cannot move. It is contemplated that the biasing member 522 may apply sufficient biasing force to the handle 110 that the handle 110 could move to a position unlatching the top 104 from the base 102 without the user having to pull on the handle 110.

The method continues with the operator actuating the lock actuator by pressing or squeezing the pair of grips 802. By actuating the lock actuator, the lock actuator is moved into the actuated position. With the top 104 now unlocked, the top 104 is pivoted away from the base 102 by the locking gas struts 711 and 710 while the lock actuator is actuated by the operator. The method ends with the operator releasing the lock actuator (i.e., the operator stops squeezing the pair of grips 802). Releasing the lock actuator results in the top 104 being locked in a current position in which the top 104 is when the lock actuator is released. Once the top 104 is in the desired position, the operator can push the handle 110 such that the handle 110 is latched in the received position by the latching assemblies 518 and 520.

To return the top 104 to the closed position from the opened position or from an intermediate position, the operator squeezes on the pair of grips 802. As a result, the top 104 is unlocked and the operator pivots the top 104 toward the base 102 by pushing down on the handle 110 to overcome the bias of the biasing members 710, 711. Once the top 104 is in the closed position, the operator releases the pair of grips 802 thereby locking the top 104 in the closed position. The operator then pushes on the handle 110 in the received position such that the handle 110 is latched by the latching assemblies 518 and 520 and that the locking pins 292, 294 and 296 are received in the apertures of the receptacles 278, 280 and 282. As a result, the latching assembly 500 (or 900) further latches the top 104 to the base 102 in the closed position.

Modifications and improvements to the above-described implementations of the present invention may become apparent to those skilled in the art. The foregoing description is intended to be exemplary rather than limiting. The scope of the present invention is therefore intended to be limited solely by the scope of the appended claims.

What is claimed is:

1. A storage container comprising:
   a base defining at least one storage compartment;
   a top operatively connected to the base, the top being
      selectively movable between a closed position covering the at least one storage compartment, and an opened position providing access to the at least one storage compartment;
a first locking gas strut operatively connected between the base and the top;
a second locking gas strut operatively connected between the base and the top, the first and second locking gas struts biasing the top toward the opened position;
a latching assembly comprising a latching actuator movable between a first position and a second position,
in response to the latching actuator being in the first position and the top being in the closed position, the top being latched in the closed position by the latching assembly; and
a locking assembly comprising:
a lock actuator having an actuated position and a released position;
an actuator bar connected to the lock actuator;
a first cable connected to a first end portion of the actuator bar;
a second cable connected to a second end portion of the actuator bar, the second end portion being opposite the first end portion;
a first gas strut locking assembly for locking the first locking gas strut, the first cable connecting the actuator bar to the first gas strut locking assembly, the lock actuator actuating the first gas strut locking assembly via the actuator bar and the first cable; and
a second gas strut locking assembly for locking the second locking gas strut, the second cable connecting the actuator bar to the second gas strut locking assembly, the lock actuator actuating the second gas strut locking assembly via the actuator bar and the second cable,
in response to the latching actuator being in the second position and the lock actuator being in the actuated position, the first and second gas strut locking assemblies unlocking the first and second locking gas struts, and the top being selectively movable between the closed position and the opened position; and
in response to the latching actuator being in the second position and the lock actuator being in the released position, the first and second gas strut locking assemblies locking the first and second locking gas struts, and the top being prevented from movement and being locked by the locking assembly in every one of the closed position, the open position and an intermediate position, the intermediate position being intermediate to the closed position and the opened position.

2. The storage container of claim 1, wherein the lock actuator is biased toward the released position.

3. The storage container of claim 1, wherein the lock actuator is supported by the latching actuator and is movable with the latching actuator.

4. The storage container of claim 1, wherein:
the latching actuator comprises a first handle; and
the lock actuator comprises a second handle.

5. The storage container of claim 1, wherein the latching actuator comprises a handle.

6. The storage container of claim 1, wherein the latching assembly further comprises:
at least one receptacle connected to the base; and
at least one locking pin connected to the latching actuator and being movable by the latching actuator;
wherein the at least one locking pin is received in the at least one receptacle when the top is in the closed position and the latching actuator is in the first position.

7. The storage container of claim 6, wherein misalignment of the at least one locking pin and the at least one receptacle blocks the latching actuator from acquiring the first position.

8. The storage container of claim 6, wherein the at least one locking pin is operatively connected to the latching actuator by at least one pull cable.

9. The storage container of claim 8, wherein:
the latching actuator is movable between the first and second positions along a first axis;
the at least one locking pin is movable by the latching actuator along a second axis; and
the second axis is perpendicular to the first axis.

10. The storage container of claim 6, wherein:
the latching actuator is movable between the first and second positions along a first axis;
the at least one locking pin is movable by the latching actuator along a second axis; and
the second axis is one of parallel to the first axis and coaxial with the first axis.

11. The storage container of claim 1, further comprising first and second arms operatively connected between the top and the base; and
wherein:
the first locking gas strut is operatively connected between the first arm and the top; and
the second locking gas strut is operatively connected between the second arm and the top.

12. The storage container of claim 1, wherein the top is pivotally connected to the base.

13. The storage container of claim 12, further comprising:
a first pair of arms operatively connected between the top and the base;
a second pair of arms operatively connected between the top and the base;
each of the first and second pair of arms forming a four-bar linkage with the top and the base; and
the four-bar linkages pivot and translate the top relative to the base as the top moves from the closed position to the opened position.

14. The storage container of claim 1, further comprising at least one touch latch selectively retaining the latching actuator of the latching assembly in the first position.

15. The storage container of claim 14, wherein the latching assembly further comprises a biasing member biasing the latching actuator of the latching assembly toward the second position.

16. The storage container of claim 1, wherein in the second position, the latching actuator provides a lever arm for facilitating lifting of the top.

17. The storage container of claim 1, wherein the latching actuator and the lock actuator are movable with the top between the closed and the opened positions.

18. A bed comprising:
the storage container of claim 1; and
a mattress disposed on the top of the storage container and movable with the top of the storage container.

19. A locking arrangement for locking a first component in relation to the second component, the first component having a closed position and an opened position in relation to the second component, a first locking gas strut being operatively connected between the first and second components, a second locking gas strut being operatively connected between the first and second components, the first and second locking gas struts biasing the first component toward the opened position, the locking arrangement comprising:
- a latching actuator movable between a first position and a second position,
- in response to the latching actuator being in the first position and the first component being in the closed position, the first component being latched in the closed position;
- a lock actuator movable between an actuated position and a released position;
- an actuator bar connected to the lock actuator;
- a first cable connected to a first end portion of the actuator bar;
- a second cable connected to a second end portion of the actuator bar, the second end portion being opposite the first end portion;
- a first gas strut locking assembly for locking the first locking gas strut, the first cable connecting the actuator bar to the first gas strut locking assembly, the lock actuator actuating the first gas strut locking assembly via the actuator bar and the first cable; and
- a second gas strut locking assembly for locking the second locking gas strut, the second cable connecting the actuator bar to the second gas strut locking assembly, the lock actuator actuating the second gas strut locking assembly via the actuator bar and the second cable
- in response to the latching actuator being in the second position and the lock actuator being in the actuated position, the first and second gas strut locking assemblies unlocking the first and second locking gas struts, and the first component being selectively movable between the closed position and the opened position;
- in response to the latching actuator being in the second position and the lock actuator being in the released position, the first and second gas strut locking assemblies locking the first and second locking gas struts, and the first component being prevented from movement relative to the second component in every one of the closed position, the open position and an intermediate position, the intermediate position being intermediate to the closed position and the opened position.

\* \* \* \* \*

UNITED STATES PATENT AND TRADEMARK OFFICE
CERTIFICATE OF CORRECTION

PATENT NO. : 11,266,252 B2
APPLICATION NO. : 16/464987
DATED : March 8, 2022
INVENTOR(S) : Michel Tremblay It is certified that error appears in the above-identified patent and that said Letters Patent is hereby corrected as shown below:

In the Claims

Column 18, Claim 19, Lines 3-4, "locking assembly via the actuator bar and the second cable" should read --locking assembly via the actuator bar and the second cable,--

Signed and Sealed this
Thirty-first Day of May, 2022

Katherine Kelly Vidal
*Director of the United States Patent and Trademark Office*